United States Patent
Qian et al.

(10) Patent No.: US 12,449,456 B2
(45) Date of Patent: Oct. 21, 2025

(54) INVERTER AND METHOD FOR DETECTING INSULATION IMPEDANCE OF INVERTER

(71) Applicant: Sungrow Power Supply Co., Ltd., Hefei (CN)

(72) Inventors: Yuandong Qian, Hefei (CN); Cheng Liang, Hefei (CN); Jiawang Li, Hefei (CN); Yongheng Qian, Hefei (CN); Nianan Pan, Hefei (CN); Zisi Tian, Hefei (CN); Jin Zhang, Hefei (CN); He Li, Hefei (CN); Jingjing Wang, Hefei (CN); Houzhi Tan, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 201 days.

(21) Appl. No.: 18/331,079

(22) Filed: Jun. 7, 2023

(65) Prior Publication Data

US 2023/0400489 A1  Dec. 14, 2023

(30) Foreign Application Priority Data

Jun. 8, 2022 (CN) .......................... 202210638325.7
Feb. 13, 2023 (CN) .......................... 202310141573.5

(51) Int. Cl.
*G01R 27/02* (2006.01)
*H02M 7/44* (2006.01)

(52) U.S. Cl.
CPC ............ *G01R 27/025* (2013.01); *H02M 7/44* (2013.01)

(58) Field of Classification Search
CPC ...... G01R 27/025; G01R 31/52; G01R 31/42; H02M 7/44

(Continued)

(56) References Cited

U.S. PATENT DOCUMENTS 2,977,531 A * 3/1961 Humes ................. G01R 27/025
324/123 R
5,450,328 A    9/1995 Janke et al.
(Continued)

FOREIGN PATENT DOCUMENTS

CN          202110220 U    1/2012
CN          102621394 A    8/2012
(Continued)

OTHER PUBLICATIONS

English translation of CN 114204594. (Year: 2022).*
(Continued)

*Primary Examiner* — Christopher P McAndrew
(74) *Attorney, Agent, or Firm* — Wolf, Greenfield & Sacks, P.C.

(57) ABSTRACT

An inverter and a method for detecting insulation impedance of the inverter are provided. During grid-connected operation of the inverter, the method includes: controlling a power supply to output two different test signals, and recording voltages of a power grid to ground corresponding to the two test signals; and calculating the insulation impedance to ground of the inverter during the grid-connected operation of the inverter according to the two test signals and the voltages of the power grid to ground corresponding to the two test signals. According to the present disclosure, the power supply outputs different test signals to disturb the voltage of the power grid to ground, so as to detect insulation impedance of the inverter during grid-connected operation of the inverter.

13 Claims, 8 Drawing Sheets

(58) Field of Classification Search
USPC .......................................................... 324/650
See application file for complete search history.

(56) References Cited

U.S. PATENT DOCUMENTS

| | | | | |
|---|---|---|---|---|
| 5,612,601 | A * | 3/1997 | Kueck | G01R 31/343 |
| | | | | 318/449 |
| 9,952,271 | B2 * | 4/2018 | Dalban Pilon | H02H 3/167 |
| 2005/0254671 | A1 | 11/2005 | Akino | |
| 2012/0014020 | A1 | 1/2012 | Lehmann | |
| 2012/0119755 | A1 | 5/2012 | Ishii et al. | |
| 2014/0225457 | A1 | 8/2014 | Elliott, II | |
| 2015/0084654 | A1 * | 3/2015 | Mueller | G01R 27/16 |
| | | | | 324/713 |
| 2015/0256116 | A1 | 9/2015 | Tateda et al. | |
| 2016/0349299 | A1 | 12/2016 | Zhou et al. | |
| 2018/0120368 | A1 | 5/2018 | Liu et al. | |
| 2020/0003820 | A1 | 1/2020 | Fukudome et al. | |
| 2020/0271713 | A1 * | 8/2020 | Zhang | G01R 31/52 |
| 2021/0011072 | A1 * | 1/2021 | Qu | G01R 31/14 |
| 2021/0067090 | A1 | 3/2021 | Zeng et al. | |
| 2021/0172987 | A1 * | 6/2021 | Wang | H02M 1/007 |
| 2022/0268822 | A1 * | 8/2022 | Ju | G01R 27/18 |
| 2022/0321039 | A1 * | 10/2022 | Mukherjee | G01R 31/1263 |
| 2022/0357411 | A1 * | 11/2022 | Reitz | G01R 31/52 |
| 2022/0390907 | A1 * | 12/2022 | Hackl | G01R 27/18 |

FOREIGN PATENT DOCUMENTS

| | | | | |
|---|---|---|---|---|
| CN | 104535839 | A | 4/2015 | |
| CN | 106329563 | A | 1/2017 | |
| CN | 110031755 | A | 7/2019 | |
| CN | 110401414 | A | 11/2019 | |
| CN | 112379173 | A | 2/2021 | |
| CN | 114039544 | A | 2/2022 | |
| CN | 114204594 | A | 3/2022 | |
| CN | 114465478 | A | 5/2022 | |
| CN | 114527326 | A | 5/2022 | |
| DE | 102019132242 | A1 * | 6/2021 | G01R 31/00 |
| EP | 3 988 947 | A1 | 4/2022 | |
| EP | 4293375 | A1 * | 12/2023 | G01R 31/42 |
| JP | H07-128378 | A | 5/1995 | |
| JP | 2005-328345 | A | 11/2005 | |
| JP | 2018-179930 | A | 11/2018 | |
| WO | WO 2020/253876 | A1 | 12/2020 | |
| WO | WO 2021/181629 | A1 | 9/2021 | |
| WO | WO 2022/061490 | A1 | 3/2022 | |

OTHER PUBLICATIONS

Geng et al., Research on Insulation Impedance Detection of DC Side in Photovoltaic Power Generation System. Telecom Power Technology. Jan. 10, 2020;37(1):24-6.

Liu et al., Impedance Modeling and Stability Analysis of the Cascaded Three-phase Symmetric Systems Using Complex Transfer Functions. 2018 International Power Electronics Conference (IPEC-Niigata 2018-ECCE Asia). May 20, 2018:3176-81.

Extended European Search Report for European Application No. 23178194.9, dated Nov. 20, 2023.

\* cited by examiner

INVERTER AND METHOD FOR DETECTING INSULATION IMPEDANCE OF INVERTER

CROSS REFERENCE TO RELATED APPLICATIONS

This application claims priority to Chinese application number 202210638325.7 filed Jun. 8, 2022, and Chinese application number 202310141573.5 filed Feb. 13, 2023. The contents of these applications are incorporated by reference in their entirety.

FIELD

The present disclosure relates to the technical field of insulation impedance detection, and in particular, to an inverter and a method for detecting insulation impedance of the inverter.

BACKGROUND

Impedance of a photovoltaic power generation system to ground includes direct-current impedance to ground and alternating-current impedance to ground. According to conventional method for detecting impedance to ground, known impedance and a known voltage source are arranged between a power grid and ground, a voltage of the power grid to ground is sampled before the voltage source is turned on, a bias direction of the voltage source is determined by comparing the bias direction with a given voltage, and finally impedance of the power grid to ground is calculated based on a impedance voltage-division principle.

According to the above method, only impedance to ground before the inverter is connected to the power grid can be detected, and impedance to ground when the inverter is connected to the power grid cannot detected.

SUMMARY

In view of this, a method for detecting insulation impedance of an inverter is provided according to the present disclosure, in which a power supply outputs different test signals to disturb a voltage of the power grid to ground, to detect insulation impedance of the inverter during grid-connected operation of the inverter.

In order to achieve the above objectives, the following technical solutions are provided according to the present disclosure.

A method for detecting insulation impedance of an inverter is provided according to a first aspect of the present disclosure. The method is applied to an inverter. The inverter includes a test circuit, and the test circuit includes a test resistor and a power supply connected in series. A direct-current side of the inverter is grounded through the test circuit, or at least one phase of an alternating-current side of the inverter is grounded through the test circuit. The method includes the following steps during grid-connected operation of the inverter:

step S101, controlling the power supply to output two different test signals, and recording voltages of a power grid to ground corresponding to the two test signals; and step S102, calculating insulation impedance to ground of the inverter during the grid-connected operation of the inverter according to the two test signals and the voltages of the power grid to ground corresponding to the two test signals.

In an embodiment, when the inverter is shut down:

in a case that the direct-current side of the inverter is grounded through the test circuit, the insulation impedance to ground of the inverter is direct-current insulation impedance; and in a case that at least one phase of the alternating-current side of the inverter is grounded through the test circuit, the insulation impedance to ground of the inverter is alternating-current insulation impedance;

when the inverter is grid-connected:

the direct-current side of the inverter or at least one phase of the alternating-current side of the inverter is grounded through the test circuit, the insulation impedance to ground of the inverter is system insulation impedance coupled to the direct-current side of the inverter and the alternating-current side of the inverter.

In an embodiment, the step S101 includes:

controlling the power supply to output a first test signal, and recording a current voltage of the power grid to ground when the voltage of the power grid to ground is stable; and controlling the power supply to output a second test signal, and recording a current voltage of the power grid to ground when the voltage of the power grid to ground is stable;

where in a case that the power supply is not connected to a circuit, a current voltage of the power grid to ground when the voltage of the power grid to ground is stable is used as the first test signal or the second test signal.

In an embodiment, the power supply is a constant voltage source, and the test signals are test voltages. The step S102 includes:

step S201, calculating a voltage change of the test resistor corresponding to the two test voltages;

step S202, calculating a current change of the test resistor caused by the voltage change;

step S203, obtaining impedance to ground by dividing a difference between two voltages of the power grid to ground by the current change; and step S204, determining the insulation impedance to ground according to the impedance to ground.

In an embodiment, the power supply is a constant current source, and the test signals are test currents. The step S102 includes:

step S301, calculating a difference between the two test currents;

step S302, calculating a difference between the voltages of the power grid to ground corresponding to the two test currents;

step S303, obtaining impedance to ground by dividing the difference between the voltages of the power grid to ground by the difference between the two test currents; and step S304, determining the insulation impedance to ground according to the impedance to ground.

In an embodiment, after the step S102 is executed, the step S101 is returned to, and the step S101 and the step S102 are executed circularly.

In an embodiment, before the step S101, the method further includes:

step S100, receiving an insulation impedance detection command, or reaching a preset time for insulation impedance detection.

In an embodiment, before the step S101, the method further includes:
   connecting the power supply to the inverter; and
   disconnecting the power supply from the inverter when the inverter is turned off.

In an embodiment, in a case that at least one phase of the alternating-current side of the inverter is grounded through the test circuit, the test resistor and the power supply are connected in series between each phase of the alternating-current side of the inverter and ground. Before the grid-connection operation of the inverter, the method further includes:
   controlling a power supply of each phase to output a preset test signal and recording a voltage of each phase of the power grid to ground, respectively; and
   calculating insulation impedance of each phase of the alternating-current side to ground according to the preset test signal and the voltage of each phase of the power grid to ground, and determining the alternating-current insulation impedance to ground before the grid-connection operation of the inverter.

An inverter is further provided according to a second aspect of the present disclosure. a main circuit. The inverter includes a main circuit, a controller and a test circuit. The test circuit includes a test resistor and a power supply connected in series. A direct-current side of the main circuit is grounded through the test circuit, or at least one phase at an alternating-current side of the main circuit between a grid-connected switch and a power grid is grounded through the test circuit. The main circuit is controlled by the controller, and the controller is configured to adjust a test signal outputted by the power supply to execute the method according to any one of the first aspect.

In an embodiment, the power supply is a constant voltage source, and the test signal is a test voltage; or the power supply is a constant current source, the test signal is a test current.

In an embodiment, each of two ends of the power supply is provided with a controllable switch, and the controllable switch is controlled by the controller.

In an embodiment, in a case that at least one phase at an alternating-current side of the main circuit between a grid-connected switch and a power grid is grounded through the test circuit, only one phase of the alternating-current side of the main circuit is grounded through the test circuit.

In the method for detecting insulation impedance of an inverter according to the present disclosure, during grid-connected operation of the inverter, a power supply is controlled to output two different test signals, and voltages of a power grid to ground corresponding to the two test signals are recorded; and the insulation impedance to ground of the inverter during the grid-connected operation of the inverter is calculated according to the two test signals and the voltages of the power grid to ground corresponding to the two test signals. According to the present disclosure, the power supply outputs different test signals to disturb the voltage of the power grid to the ground, so as to detect insulation impedance of the inverter during grid-connected operation of the inverter.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

The technical solutions in the embodiments of the present disclosure are described clearly and completely in conjunction with the drawings of the embodiments of the present disclosure hereinafter. It is apparent that the described embodiments are only some rather than all embodiments of the present disclosure. Any other embodiments obtained by those skilled in the art based on the embodiments in the present disclosure without any creative effort shall fall within the protection scope of the present disclosure.

In this specification, terms "include", "comprise" or any other variants are intended to be non-exclusive. Therefore, a process, method, article or device including a series of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

A method for detecting insulation impedance of an inverter is provided according to the present disclosure, to detect insulation impedance of the inverter during grid-connected operation of the inverter. The method for detecting insulation impedance in the present disclosure includes a method for detecting direct-current insulation impedance and a method for detecting alternating-current insulation impedance. Correspondingly, during direct-current insulation impedance detection, the direct-current side of the inverter is grounded through a test circuit for detection. During alternating-current insulation impedance detection, the alternating-current side of the inverter is grounded through a test circuit for detection. The test circuit in the present disclosure includes a test resistor and a power supply connected in series, and the power supply may be a constant voltage source or a constant current source.

Figure 1A:
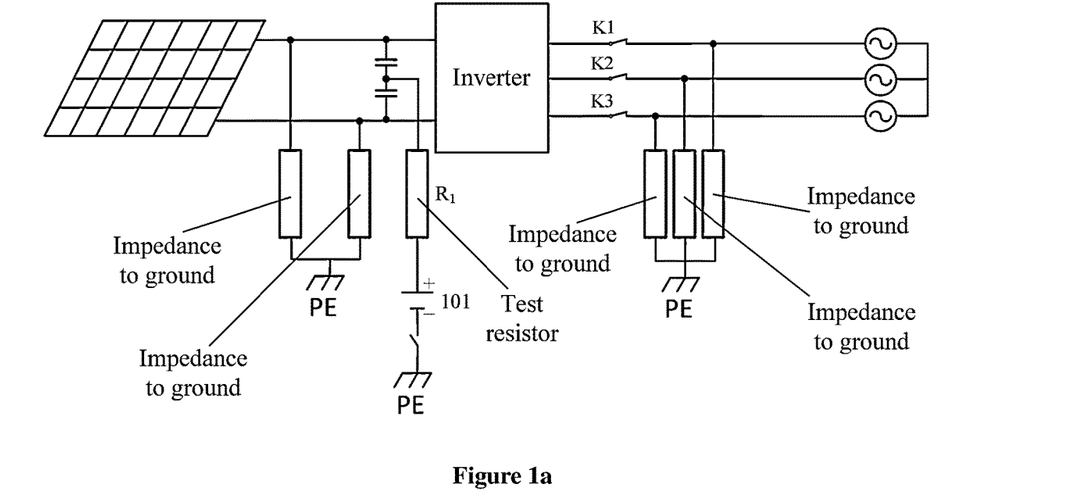
FIGS. 1a and 1b are schematic structural diagrams of an inverter with a test circuit located on a direct-current side of the inverter according to an embodiment of the present disclosure.
Figure 1B:
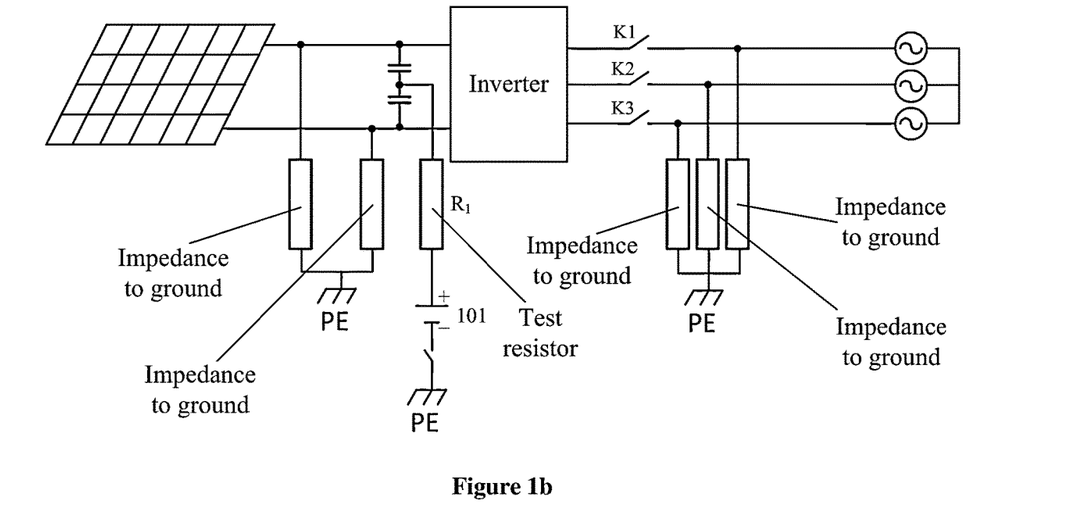

For the direct-current insulation impedance detection, as shown in FIGS. 1a and 1b, the test circuit is located on the direct-current side of the inverter and grounded. The test circuit includes a test resistor R1 and a power supply 101 that are connected in series. In FIG. 1a, switches K1 to K3 are switched on, and in FIG. 1b, switches K1 to K3 are switched off.

Figure 2A:
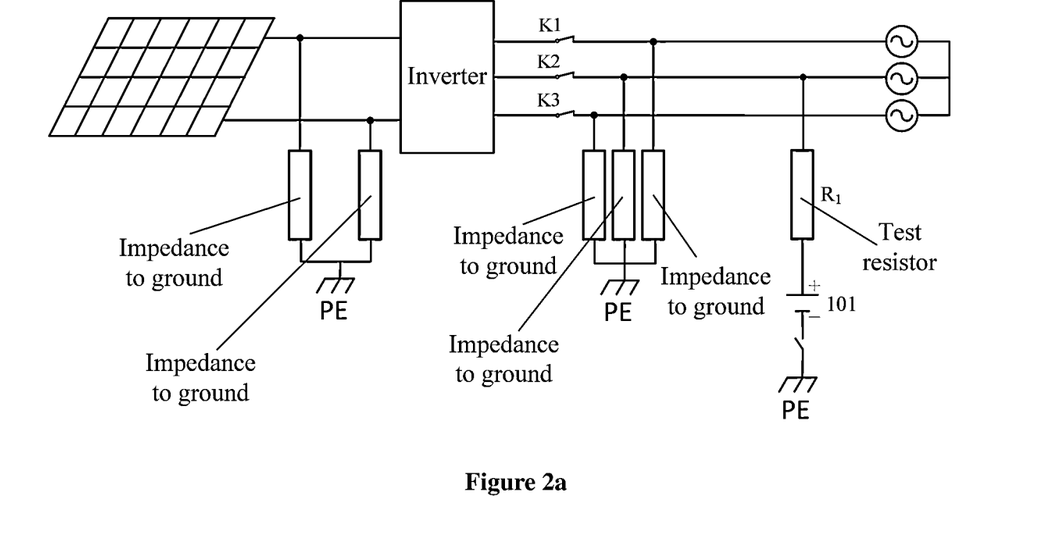
FIGS. 2a and 2b are schematic structural diagrams of an inverter with a test circuit located on an alternating-current side of the inverter according to an embodiment of the present disclosure.
Figure 2B:
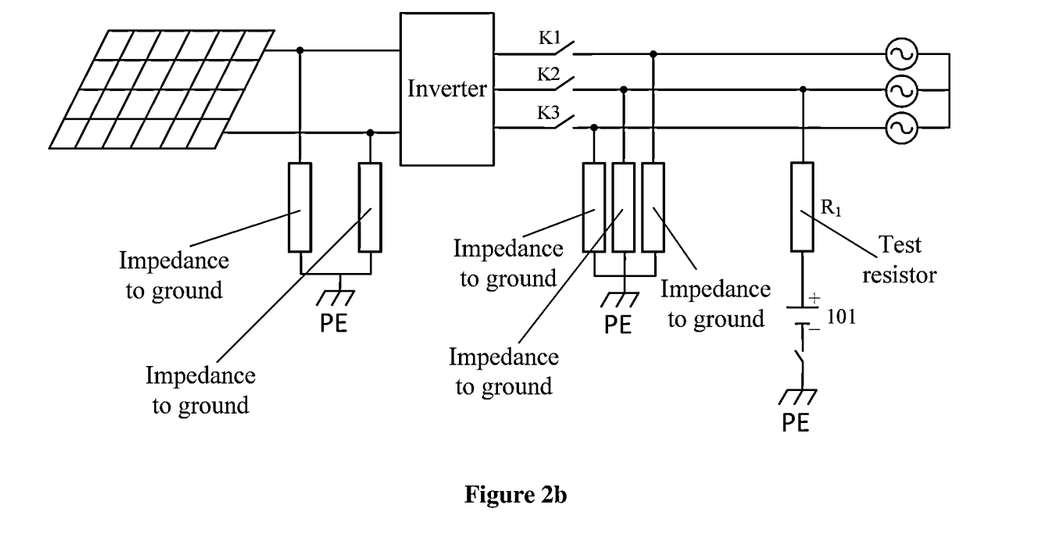

For the alternating-current insulation impedance detection, as shown in FIGS. 2a and 2b, switches K1 to K3 are switched on in FIG. 2a, and switched K1 to K3 are switched off in FIG. 2b. During the grid-connected operation of the inverter, a midpoint of a direct-current side of the inverter coincides with three-phase midpoints of the power grid, that is, the three-phase midpoints of an alternating-current side of the inverter are the same. Therefore, comprehensive insulation impedance to ground of the system may be acquired by sampling and disturbing one of three-phase voltages of the power grid. That is, only one phase can be set on the alternating-current side of the inverter and grounded through the test circuit. It should be understood that the alternating-current side of the inverter can also be equipped with two or three phases, which are grounded through the test circuit. As shown in FIGS. 2a and 2b, taking the alternating-current side of the inverter as an example, where only one phase is grounded through the test circuit, the test circuit is located on the alternating-current side of the inverter and grounded. The test circuit includes a test resistor R1 and a power supply 101 that are connected in series.

Figure 3:
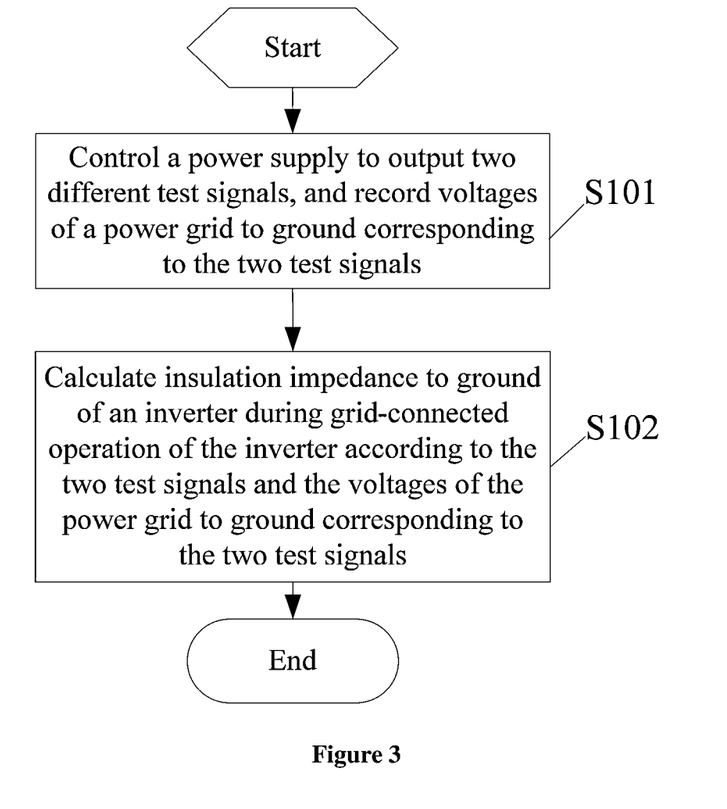
FIG. 3 is a flow chart of a method for detecting insulation impedance of an inverter according to an embodiment of the present disclosure.

In such case, the method for detecting insulation impedance of the inverter is shown in FIG. 3, and includes the following steps S101 and S102.

In step S101, the power supply is controlled to output two different test signals, and voltages of the power grid to ground corresponding to the two test signals are recorded.

In practices, in a case that the power supply is a constant voltage source, the test signal is a test voltage, specifically a voltage outputted by the constant voltage source; in a case that the power supply is a constant current source, the test signal is a test current, specifically a current outputted by the constant current source, which depends on the specific application environment. All the implementations fall within the protection scope of the present disclosure.

Specifically, the power supply is controlled to output a test signal, and a current voltage of the power grid to ground is recorded when the voltage of the power grid to ground is stable; and then the power supply is controlled to output another test signal, and a current voltage of the power grid is recorded when the voltage of the power grid to ground is stable again. Since the recorded current voltage of the power grid when the voltage of the power grid to ground is stable is closer to the real situation and can make the detection more accurate, which is an optimal solution.

In practices, a preset floating range of the voltage of the power grid to ground may be set, which may be ±5%, and is not limited thereto. In a case that the floating range of the voltage of the power grid to ground at a time instant is within the preset floating range, it is determined that the voltage of the power grid to ground is stable at the time instant. In a case that the floating range of the voltage of the power grid to ground at a time instant outsides the preset floating range, it is determined that the voltage of the power grid to ground is unstable at the time instant.

In addition, the two test signals outputted by the power supply may be any values, as long as the two test signals are different, which is not limited herein, depending on the application environment. In addition, switching the power supply out of the circuit can be understood as a zero voltage disturbance, which can also be used as a test signal. All the implementations fall within the protection scope of the present disclosure.

In step S102, the insulation impedance to ground of the inverter is calculated during the grid-connected operation of the inverter according to the two test signals and the voltages of the power grid to ground corresponding to the two test signals.

Since the outputted two different test signals bring corresponding disturbances to the voltage of the power grid to the ground, impedance of a phase of the inverter to the ground may be acquired based on a disturbance algorithm, and then the insulation impedance to the ground may be calculated.

In the above method for detecting insulation impedance according to the embodiment, the power supply outputs different test signals to disturb the voltage of the power grid to the ground, so as to detect insulation impedance of the inverter during grid-connected operation of the inverter. Moreover, according to the present disclosure, a voltage of single-phase power grid to ground is detected, to save the detection cost, which is conducive to the promotion and application in practical projects.

It should be noted that, according to the conventional method for detecting insulation impedance, initial voltages of the power grid before and after the insulation detection are required to be the same, to ensure an insulation detection accuracy. According to the conventional solution, during the grid-connected operation of the inverter, a fault of the power grid to ground or a fault of a photovoltaic panel to ground results in a change of the insulation impedance of the system, which leads to a change of the initial voltage of the power grid. If the initial voltage of the power grid acquired by initially sampling is not timely updated, the initial voltage of the power grid acquired by initially sampling is different from an actual voltage of the power grid, resulting in a low insulation detection accuracy. If the initial voltage of the power grid to the ground is detected by frequent switching, a response speed of the system is greatly reduced.

In the method for detecting insulation impedance of an inverter according to the embodiment, a power supply is used to disturb a voltage of the power grid to the ground, so that insulation impedance of a photovoltaic power generation system to the ground is acquired without detecting the initial voltage the power grid to the ground. Moreover, a process of the power supply outputting two different test signals depends on a dynamic response rate controlled by software PI (Proportional Integral), a switching time period of two different test signals is controlled to several milliseconds, improving a disturbance response speed, so as to achieve a fast response of an impedance fault.

It should be noted that in the present disclosure, when the direct-current side of the inverter is grounded through the test circuit, the insulation impedance is the direct-current insulation impedance, and the insulation impedance to ground is the direct-current insulation impedance to ground. When at least one phase on the alternating-current side of the inverter is grounded through the test circuit, the insulation impedance is alternating-current insulation impedance, and the insulation impedance to ground is alternating-current insulation impedance to ground.

In the present disclosure, the detection method for the direct-current insulation impedance to ground is essentially the same as that the alternating-current insulation impedance to ground. For the convenience of description, the following is an example of the detection method for the alternating-current insulation impedance to ground.

Figure 4:
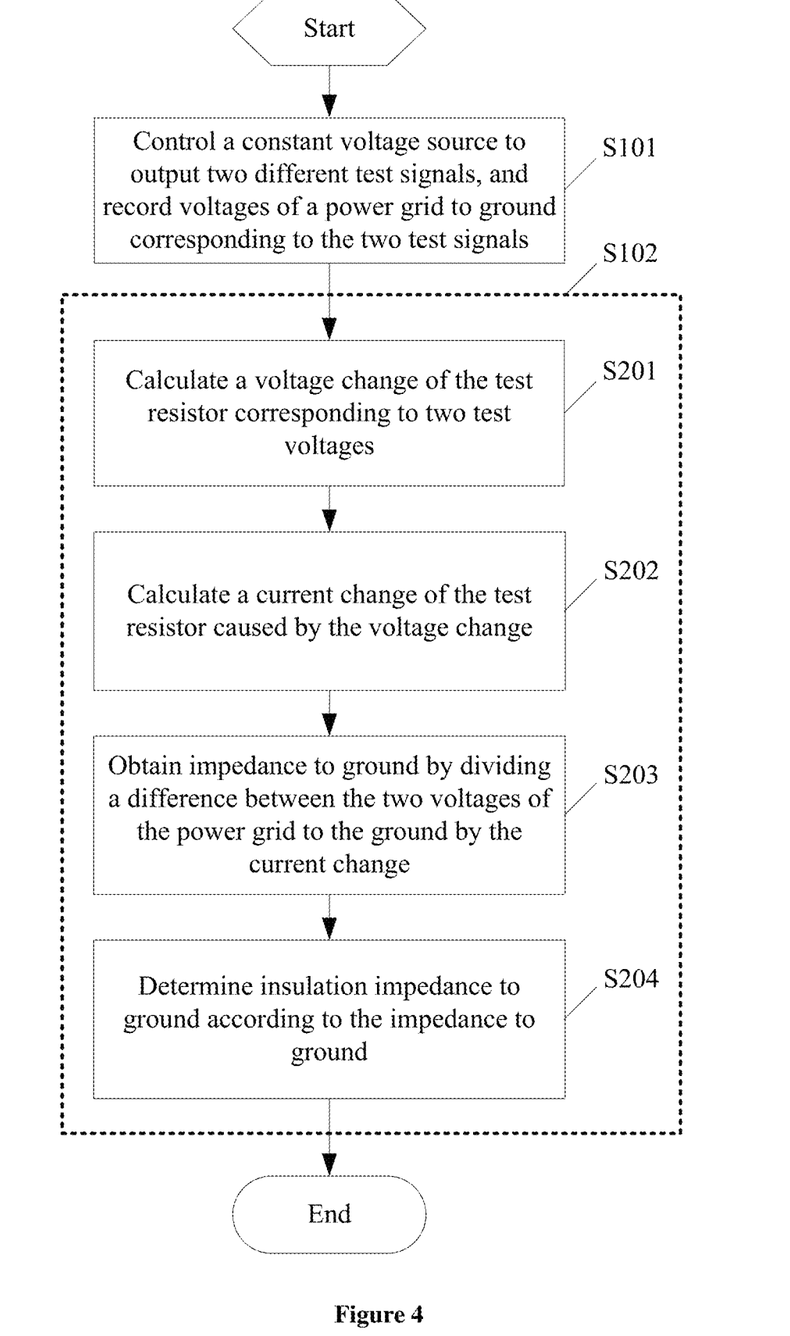
FIG. 4 is a flow chart of a method for detecting insulation impedance of an inverter according to another embodiment of the present disclosure.

Based on the above embodiment, a method for detecting insulation impedance is provided according to another embodiment of the present disclosure, in which the power supply is a constant voltage source and the test signal is a test voltage. As shown in FIG. 4, the step S102 of calculating the insulation impedance to ground of the inverter during the grid-connected operation of the inverter according to the two test signals and the voltages of the power grid to ground corresponding to the two test signals includes the following steps S201 to S204.

In step S201, a voltage change of the test resistor corresponding to two test voltages is calculated.

Figure 5:
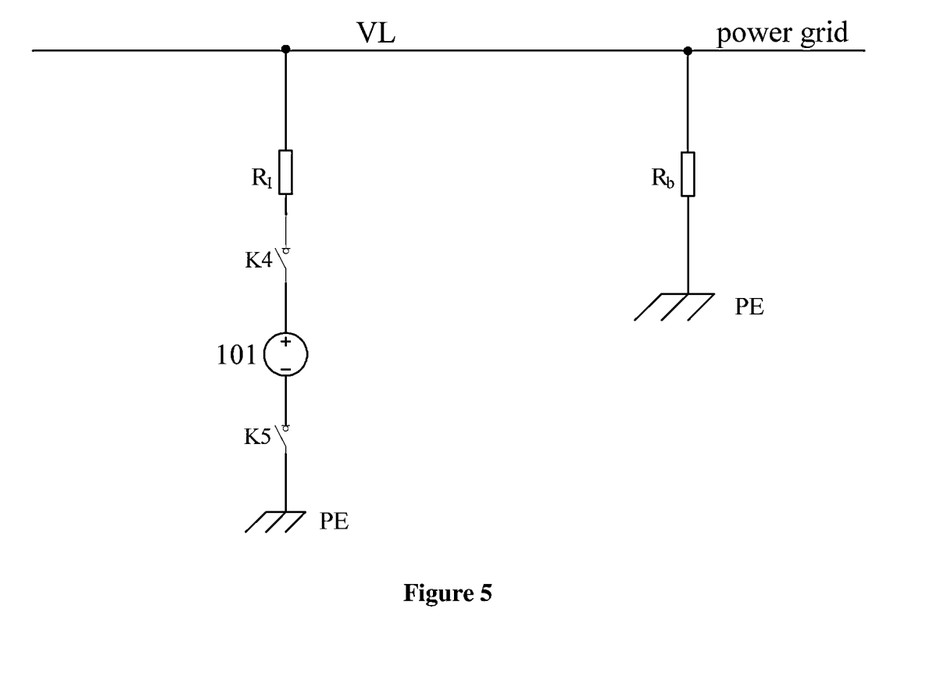
FIG. 5 is a schematic equivalent structural diagram of an inverter according to another embodiment of the present disclosure.

On the basis of FIGS. 2a and 2b, a circuit of detecting direct-current/alternating-current insulation impedance to ground is simplified to obtain FIG. 5, where 101 represents the constant voltage source, R1 represents the test resistor, VL represents the voltage of the power grid to ground, and Rb represents impedance of one phase to ground. Assuming that the constant voltage source 101 outputs a test voltage V1 for a first time, and the voltage of the power grid to ground is detected to be VL1; and the constant voltage source 101 outputs a test voltage V2 for a second time, and the voltage of the power grid to ground is detected to be VL2. Corresponding to the test voltages twice, the voltage change of the test resistor R1 is calculated by the following equation: (VL2−V2)−(VL1−V1).

In step S202, a current change of the test resistor caused by the voltage change is calculated.

After the voltage change of the test resistor R1 is obtained by (VL2−V2)−(VL1−V1) in step S201, the current change of the test resistor R1 caused by the voltage change is calculated by $[(VL2-V2)-(VL1-V1)]/R_1$.

In step S203, impedance to ground is obtained by dividing a difference between two voltages of the power grid to the ground by the current change.

It should be understood that, when the direct-current insulation impedance to ground is detected, the direct-current insulation impedance to ground is obtained, and when the alternating-current insulation impedance to ground is detected, the alternating-current insulation impedance to ground is obtained.

In a case that the voltages VL of the power grid to the ground twice are respectively the voltage VL1 and the voltage VL2, a difference of the voltage VL1 and the voltage VL2 is VL2-VL1. In such case, impedance Rb of one phase to ground at the alternating-current side in the step S203 is calculated by the following equation:

$$R_b = R_1 \times (VL2-VL1)/[(VL2-V2)-(VL1-V1)].$$

In step S204, the insulation impedance to ground is determined according to the impedance to ground.

It should be understood that, when the direct-current insulation impedance to ground is detected, the direct-current insulation impedance to ground is determined according to the direct-current impedance to ground in step S204. When the alternating-current insulation impedance to ground is detected, the alternating-current insulation impedance to ground is determined according to the alternating-current impedance to ground in step S204.

For example, when the impedance to ground at the direct-current side is calculated in step S203, the direct-current insulation impedance to ground $R_{ISO}$ is calculated by the following equation:

$$R_{ISO} = R_b = R_1 \times (VL2-VL1)/[(VL2-V2)-(VL1-V1)].$$

For example, when the impedance of one phase to ground at the alternating-current side is calculated in step S203, during the grid-connected operation of the inverter, the midpoint of the direct-current side of the inverter coincides with three-phase midpoints of the power grid, the impedance of one phase to ground at the alternating-current side is divided by three to acquire the alternating-current insulation impedance $R_{ISO}$ to the ground, that is, is calculated by the following equation:

$$R_{ISO} = R_b/3 = R_1 \times (VL2-VL1)/3[(VL2-V2)-(VL1-V1)].$$

That is, in practices, the constant voltage source 101 is connected to any phase of the three-phase power grid through the test resistor R1. During the grid-connected operation of the inverter, the constant voltage source 101 is first controlled to output the test voltage V1, the voltage VL1 of the power grid to the ground is recorded when the voltage of the power grid to ground is stable; and then the constant voltage source 101 is controlled to output the test voltage V2, the voltage VL2 of the power grid to the ground is recorded when the voltage of the power grid to ground is stable, alternating-current insulation impedance to the ground is $R_{ISO}$, and the insulation impedance $R_{ISO}$ to the ground is calculated through the above equation.

In practices, data positions of the two test voltages in the above equation may be interchanged, that is, the equation may also be expressed as:

$$R_{ISO} = R_1 \times (VL1-VL2)/3[(VL1-V1)-(VL2-V2)],$$

depending on the specific application environment. All the implementations fall within the protection scope of the present disclosure.

Figure 6:
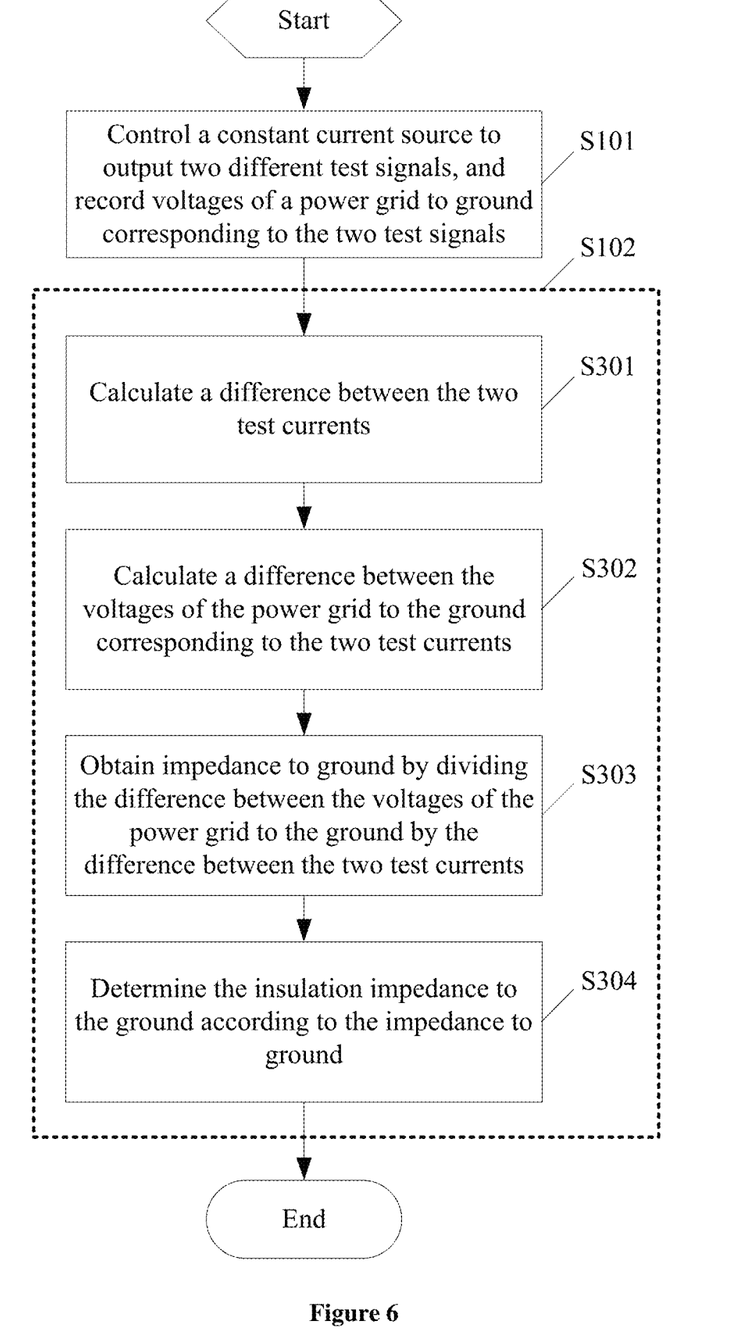
FIG. 6 is a flow chart of a method for detecting insulation impedance of an inverter according to another embodiment of the present disclosure.

Similar to the solution that the constant voltage source outputs different voltages to disturb the voltage of the power grid to the ground, a method for detecting insulation impedance of an inverter is provided according to another embodiment of the present disclosure, in which the power supply is a constant current source and the test signal is a test current, and the constant current source outputs different currents to disturb the voltage of the power grid to the ground, to detect insulation impedance. As shown in FIG. 6, the step S102 of calculating the insulation impedance to ground of the inverter during the grid-connected operation of the inverter according to the two test signals and the voltages of the power grid to ground corresponding to the two test signals includes steps S301 to S304.

In step S301, a difference between the two test currents is calculated.

Reference is made to FIG. 5, which is a simplified circuit of detecting insulation impedance to ground. The embodiment is different from the above embodiment in that 101 represents the constant current source. Assuming that the constant current source 101 outputs a test current I1 for a first time, and the constant current source 101 outputs a test current I2 for a second time, a difference between the two test currents is calculated by the following equation I2−I1.

In step S302, a difference between the voltages of the power grid to the ground corresponding to the two test currents is calculated.

In a case that the voltages VL of the power grid to the ground twice are respectively the voltage VL1 and the voltage VL2, the difference of the voltages of the power grid to the ground corresponding to the two test currents is VL2−VL1.

In step S303, impedance to ground is obtained by dividing the difference between the voltages of the power grid to the ground by the difference between the two test currents.

It should be understood that, when the direct-current insulation impedance to ground is detected, the direct-current insulation impedance to ground is determined according to the direct-current impedance to ground. When the alternating-current insulation impedance to ground is detected, the alternating-current insulation impedance to ground is determined according to the alternating-current impedance to ground.

After the difference I2−I1 between the two test currents is obtained in step S301, and the difference of the voltages VL2-VL1 of the power grid to the ground corresponding to the two test currents is obtained in step S302, the impedance to ground in step S303 is calculated by the following equation: $R_b=(VL2-VL1)/(I2-I1)$.

In step S304, the insulation impedance to the ground is determined according to the impedance to ground.

It should be understood that, when the direct-current insulation impedance to ground is detected, the direct-current insulation impedance to ground is determined according to the direct-current impedance to ground in step S304. When the alternating-current insulation impedance to ground is detected, the alternating-current insulation impedance to ground is determined according to the alternating-current impedance to ground in step S304.

For example, when the impedance to ground at the direct-current side is calculated in step S303, the direct-current insulation impedance to ground $R_{ISO}$ is calculated by the following equation:

$$R_{ISO}=R_b=(VL2-VL1)/(I2-I1).$$

For example, when the impedance of one phase to ground at the alternating-current side is calculated in step S303, during the grid-connected operation of the inverter, the midpoint of the direct-current side of the inverter coincides with three-phase midpoints of the power grid, the impedance of one phase to ground at the alternating-current side is divided by three to acquire the alternating-current insulation impedance $R_{ISO}$ to the ground, that is, is calculated by the following equation:

$$R_{ISO}=R_b/3=(VL2-VL1)/3(I2-I1).$$

That is, in practices, the constant current source 101 is connected to any phase of the three-phase power grid through the test resistor R1. During the grid-connected operation of the inverter, the constant current source 101 is first controlled to output the test current I1, the voltage VL1 of the power grid to the ground is recorded when the voltage of the power grid to ground is stable; and then the constant current source 101 is controlled to output the test current I2, the voltage VL2 of the power grid to the ground is recorded when the voltage of the power grid to ground is stable, alternating-current insulation impedance is $R_{ISO}$, and the insulation impedance $R_{ISO}$ to the ground is calculated through the above equation.

In practices, data positions of the two test currents in the above equation may be interchanged, that is, the equation may also be expressed as: $R_{ISO}=R_b/3=(VL1-VL2)/3(I1-I2)$, depending on the specific application environment. All the implementations fall within the protection scope of the present disclosure.

It should be noted that according to the conventional method for detecting insulation impedance, in a case that impedance of a negative pole PV− of the direct-current side to ground is low, the midpoint of the power grid has a large offset, only lifting the midpoint of the power grid has some disadvantages.

In the method for detecting insulation impedance of an inverter according to the embodiment, a constant current source is connected to the power grid, the constant current source outputs different currents to disturb the voltage of the power grid to the ground, and the voltage change of the power grid to the ground before and after the current disturbance is calculated to detect the insulation impedance of the inverter to the ground, so as to achieve the application of the insulation impedance detection projection.

Based on the above embodiments, two start-up ways for the method for detecting insulation impedance are provided according to an embodiment of the present disclosure.

Figure 7A:
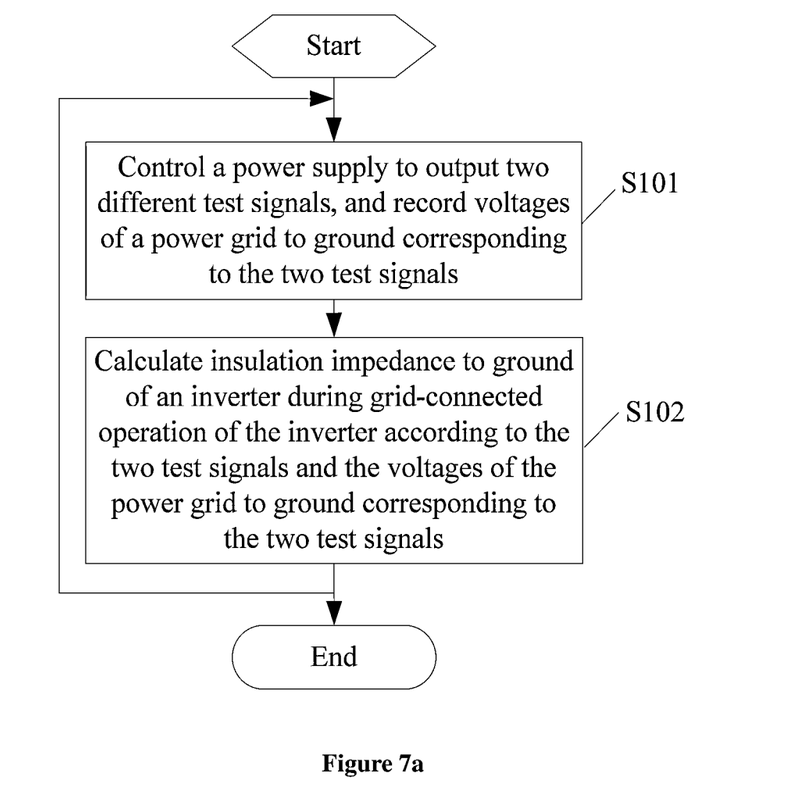
FIGS. 7a and 7b are flow charts respectively showing a method for detecting insulation impedance of an inverter according to another embodiment of the present disclosure.

In a first way, insulation impedance is detected in real time. In such case, the method for detecting insulation impedance is shown in FIG. 7a (based on FIG. 3). After step S102 is executed each time, the step S101 is returned to, so that the step S101 and the step S102 are executed circularly. In addition, the voltage of the power grid to ground is obtained twice in each cycle, so that a detection result can be updated in real time.

In this way, all detection data may be updated in real time, to solve a problem of impedance error caused by data not be updated in real time due to environmental changes in the process of insulation impedance detection, ensuring a rapid response and detection accuracy when the impedance of the system fluctuates, and improving the safety and reliability of the system. During grid-connected operation of the inverter, personal safety and device safety are protected by real-time detection of impedance of alternating-current side and direct-current side to ground.

Figure 7B:
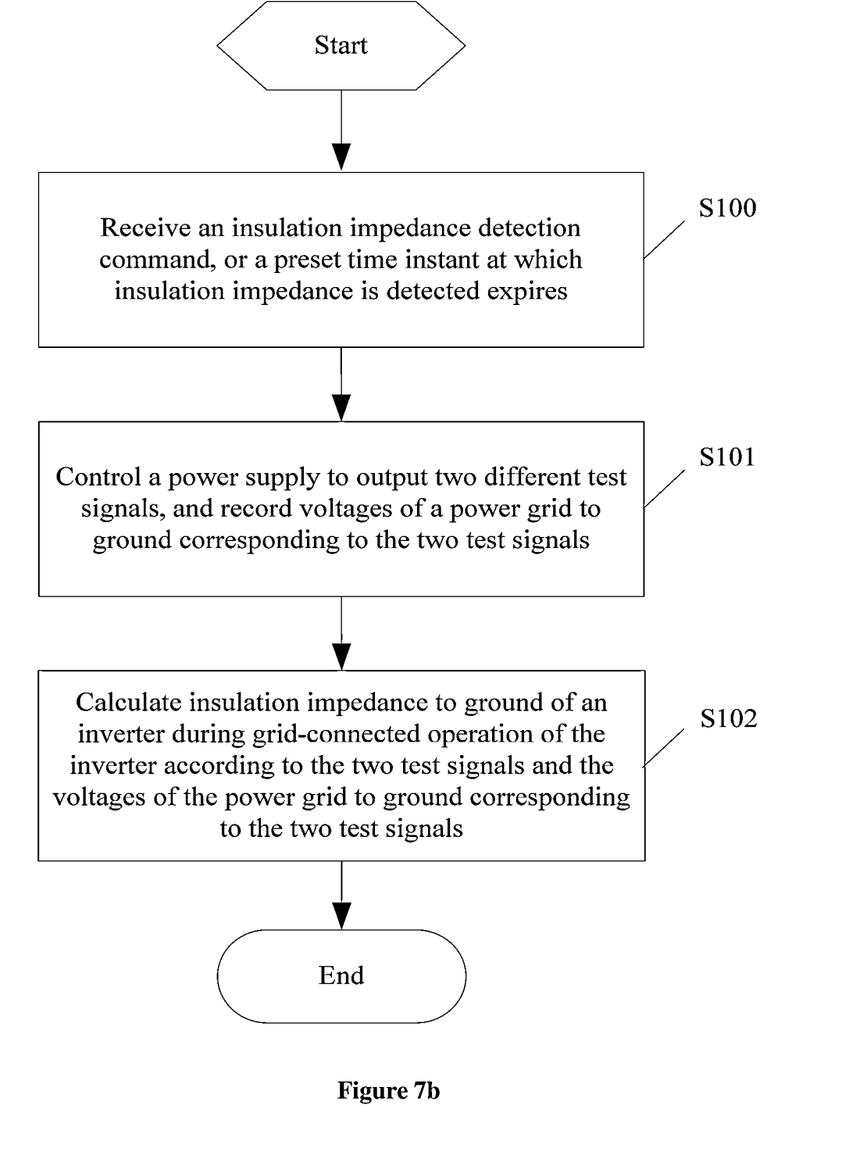

In a second way, in a case that there is a further application demand for the detection result, or the method for detecting insulation impedance is performed at different time instants according to a preset detection cycle inside the inverter, the method for detecting insulation impedance is shown in FIG. 7b (based on FIG. 3), before step S101, the method further includes the following step S100.

In step S100, an insulation impedance detection command is received, or a preset time instant at which insulation impedance is detected expires.

It should be understood that, when the direct-current insulation impedance to ground is detected, the direct-current insulation impedance detection command is received, or the preset time instant at which direct-current insulation impedance is detected expires in step S100. When the alternating-current insulation impedance to ground is detected, the alternating-current insulation impedance detection command is received, or the preset time instant at which alternating-current insulation impedance is detected expires in step S100.

That is, an upper computer may send the direct-current/alternating-current insulation impedance detection command at a time instant when the insulation impedance detection is required. When receiving the direct-current/alternating-current insulation impedance detection command, the inverter may detect direct-current/alternating-current insulation impedance without continuously detecting the direct-current/alternating-current insulation impedance to the ground, reducing the number of disturbances and effectively ensuring the service life of the device. Alternatively, a detection cycle may further be preset inside the inverter. When the preset time instant at which direct-current/alternating-current insulation impedance is detected expires, the inverter is controlled to perform direct-current/alternating-current insulation impedance detection, and then all data may be updated through periodic cycle detection, which can ensure a rapid response and detection accuracy when the impedance of the system fluctuates.

In practices, the detection cycle may be a fixed duration, for example, 10 minutes, which is not limited thereto, depending on the application environment. All the implementations fall within the protection scope of the present disclosure.

It should be noted that according to the conventional solution, the power supply is connected to the inverter only when insulation impedance is detected. During the grid-connected operation of the inverter, the power supply is required to be cut off continuously, that is, a switching device in the power supply circuit is required to be turned off continuously. Due to the inherent mechanical life of the device, it is difficult to ensure the service life of the device within a design cycle.

Therefore, based on the above embodiments, a method for detecting insulation impedance of an inverter is provided according to another embodiment of the present disclosure. Before step S101, the method further includes: connecting the power supply to the inverter. In addition, the method further includes: disconnecting the power supply from the inverter when the inverter is turned off.

In the present disclosure, when the direct-current insulation impedance to ground is detected, the power supply is connected to the to the direct-current side of the inverter, and the power supply is disconnected from the direct-current side of the inverter when the inverter is turned off. When the alternating-current insulation impedance to ground is detected, the power supply is connected to the alternating-current of the inverter, and the power supply is disconnected from the alternating-current of the inverter when the inverter is turned off.

That is, in the method for detecting insulation impedance according to the embodiment, during the grid-connected operation of the inverter, the power supply is connected to the inverter, and is controlled to output test signals through software without continuously turning off the switching device in the power supply circuit, avoiding operations of control and drive. Only when the inverter is turned off, the power supply is disconnected from the inverter, reducing the number of disturbances, improving the response speed of the system and the service life of the device in the design cycle.

In addition, in practices, when the alternating-current insulation impedance to ground is detected, if it is required to detect the alternating-current insulation impedance of the inverter before the grid-connection operation of the inverter, corresponding devices may be arranged on each phase at the alternating-current side of the inverter based on the above embodiments, that is, the test resistor and the power supply are connected in series between each phase of the alternating-current side of the inverter and ground, the method for detecting alternating-current insulation impedance of an inverter may further include:

controlling a power supply of each phase to output a test signal, and recording a voltage of each phase of the power grid to the ground, respectively; and calculating insulation impedance of each phase of the alternating-current side to ground according to the preset test signal and the voltage of each phase of the power grid to ground, and determining the alternating-current insulation impedance to ground before the grid-connection operation of the inverter.

This calculation process may refer to a voltage division algorithm in the conventional technology, and is not repeated herein.

In the embodiment, the test resistor and the power supply are connected in series between each phase of the alternating-current side of the inverter and the ground, so as to detect the alternating-current insulation impedance before grid-connection operation of the inverter.

An inverter is further provided according to another embodiment of the present disclosure. As shown in FIG. 1, the inverter includes a main circuit, a controller and a test circuit. The test circuit includes a test resistor and a power supply connected in series. A direct-current side of the main circuit is grounded through the test circuit, or at least one phase at an alternating-current side of the main circuit between a grid-connected switch and a power grid is grounded through the test circuit.

For example, when the alternating-current insulation impedance to ground is detected, a grid-connected switch (such as K1, K2 and K3 as shown in FIGS. 2a and 2b) on an alternating-current side of the main circuit is connected to one phase (only one phase is shown as an example in FIGS. 2a and 2b) of the power grid to form a connection point, and a test resistor $R_1$ and a power supply 101 are connected in series between the connection point and the ground.

In practices, in a case that the power supply 101 is a constant voltage source, the test signal is a test voltage, specifically a voltage outputted by the constant voltage source; in a case that the power supply is a constant current source, the test signal is a test current, specifically a current outputted by the constant current source, which depends on the specific application environment. All the implementations fall within the protection scope of the present disclosure.

The main circuit is controlled by the controller, and the controller is configured to modify a test signal outputted by the power supply 101 to perform the method for detecting insulation impedance of an inverter according to any one of the above embodiments. The specific process and principle of the method for detecting insulation impedance may refer to the above embodiments, which are not repeated herein. According to the solution, the insulation impedance to ground can be detected in real time based on a disturbance algorithm, which has features of fast response and high detection accuracy, so as to effectively meet the application requirements of practical projects.

In practices, in order to connect or disconnect the power supply 101, the inverter may further be provided with controllable switches at two ends of the power supply 101, such as K4 and K5 shown in FIG. 5. The two controllable switches are controlled by the controller. During grid-connected operation of the inverter, in order to detect the insulation impedance of the inverter in real time, the two controllable switches K4 and K5 are controlled to be turned on, and the two controllable switches K4 and K5 are controlled to be turned off when the system is shut down.

In addition, when the alternating-current insulation impedance to ground is detected, if it is required to detect the alternating-current insulation impedance of the inverter before the grid-connection operation of the inverter, corresponding devices may be arranged on each phase at the alternating-current side of the inverter. In such case, the test resistor and the power supply are connected in series between each phase of the alternating-current side of the inverter and ground. Before the grid-connection operation of the inverter, alternating-current insulation impedance of one phase to ground may be detected by connecting the power supply to the phase. During the grid-connection operation of the inverter, the power supply is connected to any one phase, and the power supply outputs test signals to disturb the voltage of the power grid to the ground, so as to detect alternating-current insulation impedance of the inverter during grid-connected operation of the inverter.

Same or similar parts among the embodiments in the present disclosure may be referred to each other, and each embodiment mainly emphasizes the difference from other embodiments. Since the system and embodiments of the system are basically similar to embodiments of the method, the description thereof is relatively simple, and for relevant matters, reference may be made to the description of the embodiments of the method. The system and the embodiments of the system described above are merely schematic. A unit described as a separated component may be physically separated or not. Components shown as units may be physical units or not, that is, the components may be located in one place or may be distributed onto multiple network units. Some or all modules thereof may be selected based on an actual requirement, to implement an objective of the solution in the embodiments. Those skilled in the art can understand and implement the embodiments without any creative work.

Those skilled in the art further understand that units and algorithm steps described in combination with the disclosed embodiments may be implemented by electronic hardware, computer software or a combination thereof. In order to clearly describe interchangeability of the hardware and the software, steps and composition of each embodiment are generally described above based on functions. Whether the functions are realized by the hardware or the software is determined by specific applications of the technical solutions and design constraints. For each of the specific applications, those skilled in the art may adopt a specific implementation to realize the functions described above, and the implementation should fall within the scope of the present disclosure.

Based on the above description of the disclosed embodiments, features described in the embodiments in this specification may be replaced or combined so that those skilled in the art can implement or use the present disclosure. Various modifications to these embodiments are apparent to those skilled in the art, the general principles defined herein may be implemented in other embodiments without departing from the scope of the present disclosure. Therefore, the present disclosure is not limited to the embodiments described herein, but should be in accordance with the broadest scope consistent with the principle and novel features disclosed herein.

The invention claimed is:

1. A method for detecting insulation impedance of an inverter, applied to an inverter, the inverter comprising a test circuit, the test circuit comprising a test resistor and a power supply connected in series, a direct-current side of the inverter being grounded through the test circuit, or at least one phase of an alternating-current side of the inverter being grounded through the test circuit;
   wherein the method comprises the following steps during grid-connected operation of the inverter:
   step S101, controlling the power supply to output two different test signals, and recording voltages of a power grid to ground corresponding to the two test signals; and
   step S102, calculating insulation impedance to ground of the inverter during the grid-connected operation of the inverter according to the two test signals and the voltages of the power grid to ground corresponding to the two test signals.

2. The method according to claim 1, wherein
   when the inverter is shut down,
   in a case that the direct-current side of the inverter is grounded through the test circuit, the insulation impedance to ground of the inverter is direct-current insulation impedance; and
   in a case that at least one phase of the alternating-current side of the inverter is grounded through the test circuit, the insulation impedance to ground of the inverter is alternating-current insulation impedance; and
   when the inverter is grid-connected,
   the direct-current side of the inverter or at least one phase of the alternating-current side of the inverter is grounded through the test circuit, the insulation impedance to ground of the inverter is system insulation impedance coupled to the direct-current side of the inverter and the alternating-current side of the inverter.

3. The method according to claim 1, wherein the step S101 comprises:
   controlling the power supply to output a first test signal, and recording a current voltage of the power grid to ground when the voltage of the power grid to ground is stable; and
   controlling the power supply to output a second test signal, and recording a current voltage of the power grid to ground when the voltage of the power grid to ground is stable;
   wherein in a case that the power supply is not connected to a circuit, a current voltage of the power grid to ground when the voltage of the power grid to ground is stable is used as the first test signal or the second test signal.

4. The method according to claim 1, wherein the power supply is a constant voltage source, and the test signals are test voltages;
   wherein the step S102 comprises:
   step S201, calculating a voltage change of the test resistor corresponding to the two test voltages;
   step S202, calculating a current change of the test resistor caused by the voltage change;
   step S203, obtaining impedance to ground by dividing a difference between two voltages of the power grid to ground by the current change; and
   step S204, determining the insulation impedance to ground according to the impedance to ground.

5. The method according to claim 1, wherein the power supply is a constant current source, and the test signals are test currents;
   wherein the step S102 comprises:
   step S301, calculating a difference between the two test currents;
   step S302, calculating a difference between the voltages of the power grid to ground corresponding to the two test currents;
   step S303, obtaining impedance to ground by dividing the difference between the voltages of the power grid to ground by the difference between the two test currents; and
   step S304, determining the insulation impedance to ground according to the impedance to ground.

6. The method according to claim 1, wherein after the step S102 is executed, the step S101 is returned to, and the step S101 and the step S102 are executed circularly.

7. The method according to claim 1, wherein before the step S101, the method further comprises:
   step S100, receiving an insulation impedance detection command, or reaching a preset time for insulation impedance detection.

8. The method according to claim 1, wherein before the step S101, the method further comprises:
   connecting the power supply to the inverter; and
   disconnecting the power supply from the inverter when the inverter is turned off.

9. The method according to claim 1, wherein in a case that at least one phase of the alternating-current side of the inverter is grounded through the test circuit, the test resistor and the power supply are connected in series between each phase of the alternating-current side of the inverter and ground;

wherein before the grid-connection operation of the inverter, the method further comprises:

controlling a power supply of each phase to output a preset test signal and recording a voltage of each phase of the power grid to ground, respectively; and calculating insulation impedance of each phase of the alternating-current side to ground according to the preset test signal and the voltage of each phase of the power grid to ground, and determining the alternating-current insulation impedance to ground before the grid-connection operation of the inverter.

10. An inverter, comprising a main circuit, a controller and a test circuit, wherein the test circuit comprises a test resistor and a power supply connected in series;

a direct-current side of the main circuit is grounded through the test circuit, or at least one phase at an alternating-current side of the main circuit between a grid-connected switch and a power grid is grounded through the test circuit; and the main circuit is controlled by the controller, and the controller is configured to adjust a test signal outputted by the power supply to execute a method for detecting insulation impedance of an inverter;

wherein the method comprises the following steps during grid-connected operation of the inverter:

step S101, controlling the power supply to output two different test signals, and recording voltages of a power grid to ground corresponding to the two test signals; and step S102, calculating insulation impedance to ground of the inverter during the grid-connected operation of the inverter according to the two test signals and the voltages of the power grid to ground corresponding to the two test signals.

11. The inverter according to claim 10, wherein the power supply is a constant voltage source, and the test signal is a test voltage; or the power supply is a constant current source, the test signal is a test current.

12. The inverter according to claim 10, wherein each of two ends of the power supply is provided with a controllable switch, and the controllable switch is controlled by the controller.

13. The inverter according to claim 10, wherein in a case that at least one phase at an alternating-current side of the main circuit between a grid-connected switch and a power grid is grounded through the test circuit, only one phase of the alternating-current side of the main circuit is grounded through the test circuit.

* * * * *